No. 637,625. Patented Nov. 21, 1899.
H. LEITNER.
APPARATUS FOR FORMING PLATES FOR SECONDARY BATTERIES.
(Application filed June 12, 1899.)
(No Model.) 3 Sheets—Sheet 1.

Witnesses
Inventor
Henry Leitner
by James L. Norris
atty

No. 637,625. Patented Nov. 21, 1899.
H. LEITNER.
APPARATUS FOR FORMING PLATES FOR SECONDARY BATTERIES.
(Application filed June 12, 1899.)
(No Model.) 3 Sheets—Sheet 3.

UNITED STATES PATENT OFFICE.

HENRY LEITNER, OF LONDON, ENGLAND.

APPARATUS FOR FORMING PLATES FOR SECONDARY BATTERIES.

SPECIFICATION forming part of Letters Patent No. 637,625, dated November 21, 1899.

Application filed June 12, 1899. Serial No. 720,244. (No model.)

*To all whom it may concern:*

Be it known that I, HENRY LEITNER, electrical engineer, a citizen of England, residing at No. 207 Piccadilly, London, England, have invented a certain new and useful Apparatus for Forming Plates for Secondary Batteries, of which the following is a specification.

The invention relates to an apparatus for forming plates or electrodes of secondary batteries so arranged that the expansive force of the active material during its change into peroxid is utilized for subjecting the plates to great pressure while they are being formed. Apparatus for this purpose is constructed and operates as will be described with reference to the accompanying drawings.

Figure 1:
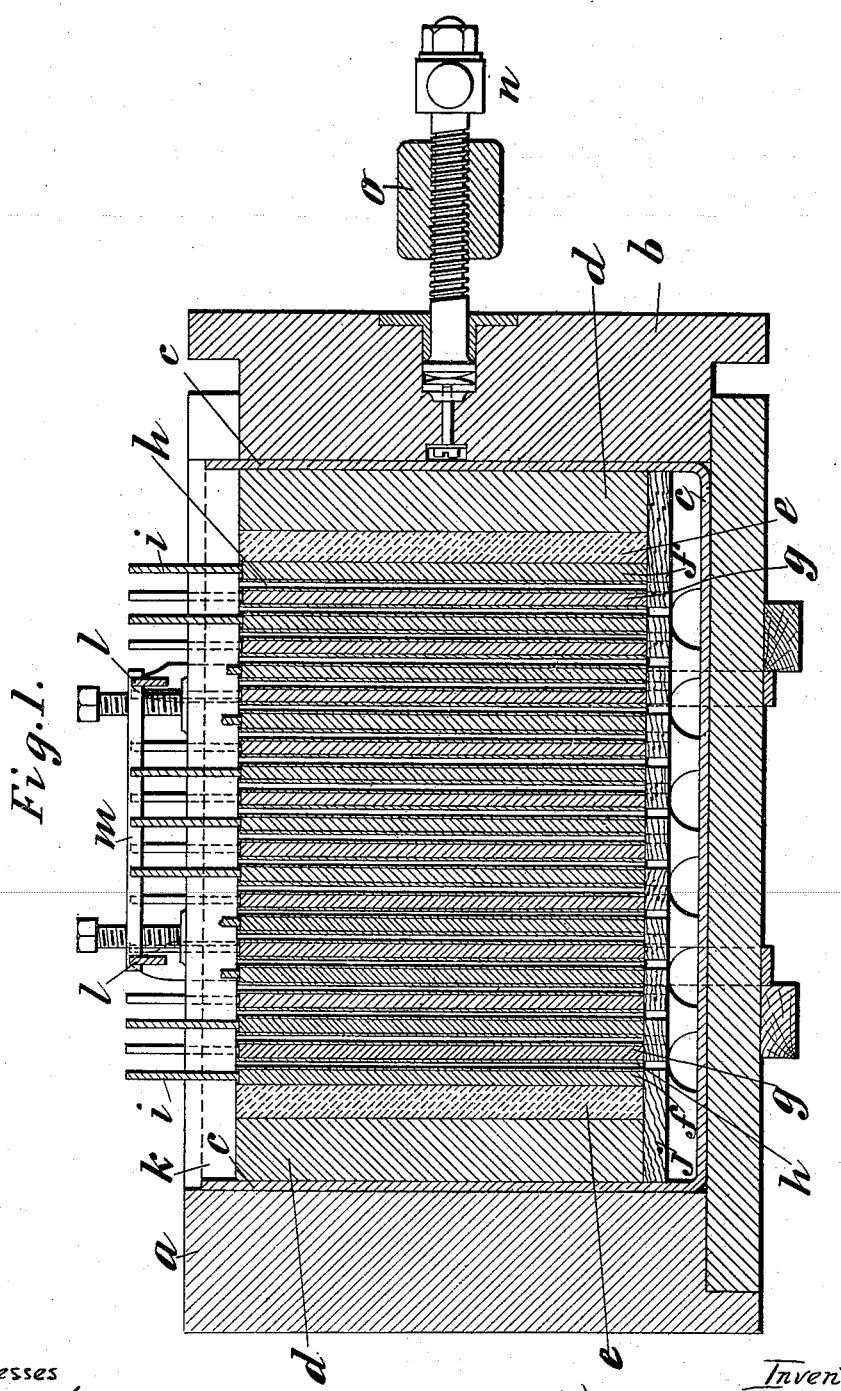
Figure 2:
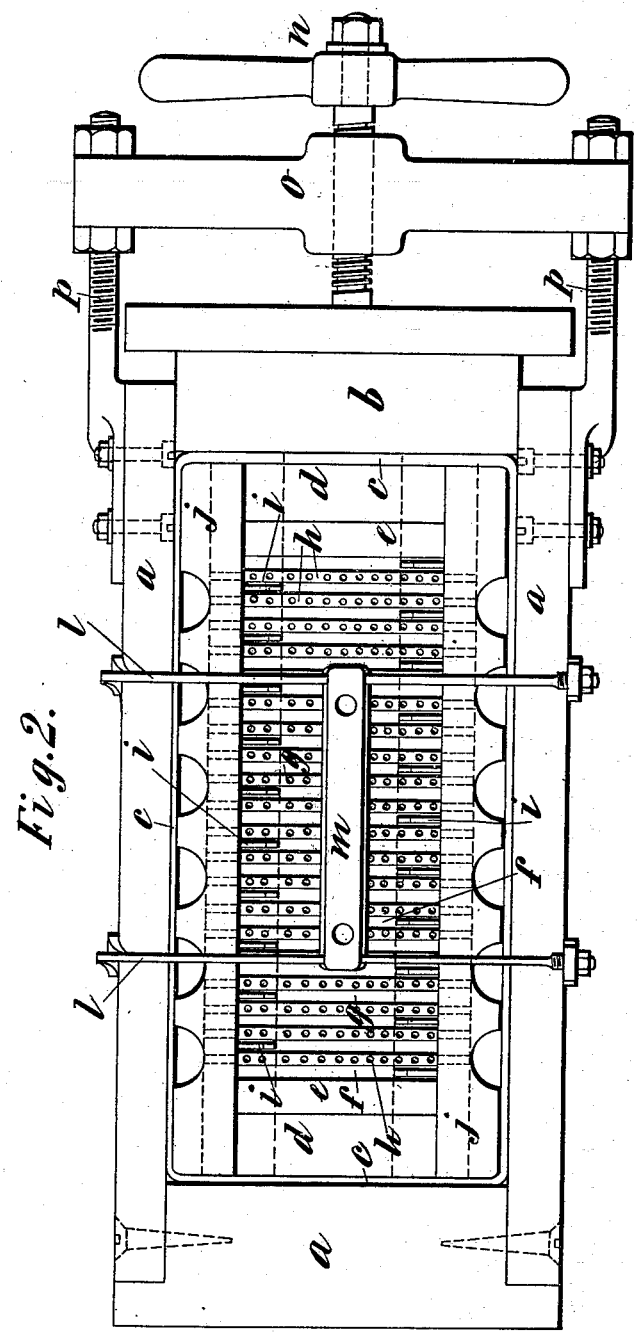

Figure 1 is a longitudinal section. Fig. 2 is a plan with part removed to show the interior, and Fig. 3 a transverse section.

$a$ is a strong box which may be of wood, as shown, with one end open to receive an adjustable closing-block $b$. Inside the box there is a lining $c$ of thick soft rubber, this cell receiving the plates to be formed and the electrolyte. Inside the lining, at each end, is fitted a block $d$, and inside these are thick rubber pads $e$. The positive and negative plates $f$ and $g$ are placed alternately between these pads, and between the adjacent plates there is a separating-piece $h$, of porous material, such as porcelain, with vertical holes extending throughout its length. These holes allow free circulation of the electrolyte in which the plates are placed. Conducting-lugs $i$ extend up from the positive and negative plates at each side of the box.

Figure 3:
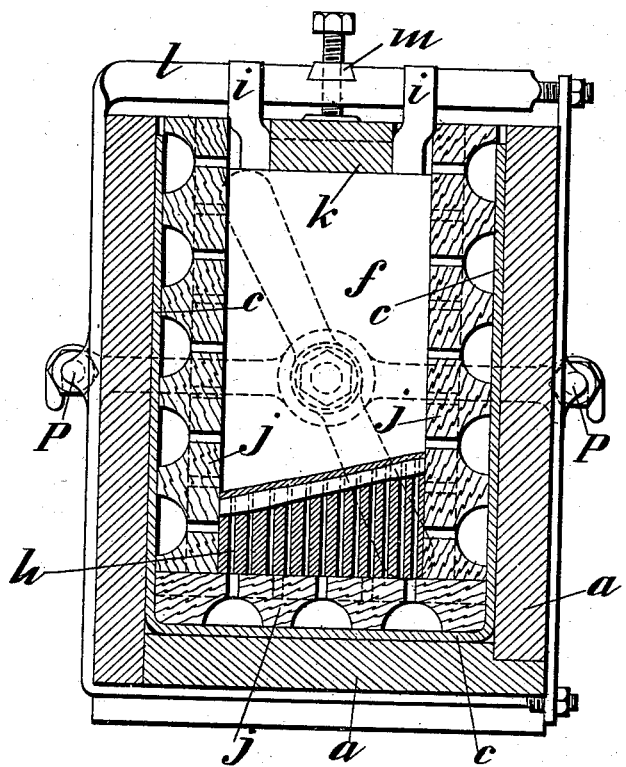

Under the plates and at each side of them within the rubber lining are placed the wooden blocks $j$, having on one side grooves, both longitudinal and transverse, and holes from them to the flat sides, allowing the electrolyte to circulate. Above the plates a covering-piece $k$ is fixed between the conducting-lugs $i$ by metal bands $l$, which extend around the outside of the box, as shown in Fig. 3. These bands are twisted, so that their upper parts extend across the box edgewise, and are notched to receive a cross-piece $m$, through which pass set-screws pressing the piece $k$ down on the upper edges of the plates and resisting their vertical expansion. In Fig. 2 the piece $k$ is omitted, so as to show the parts below.

The block $b$ is adjusted by a hand-screw $n$, which turns freely in $b$ and bears against a bolster fitted in a recess of the block. The cross-bar $o$, which is the nut of the screw $n$, is carried by supports $p$, bolted to the sides of the box. The adjustable block $b$ is screwed up after the plates are inserted in the box. The bottom and side blocks $j$ and cover $k$ closely fit against the plates, which are thus held rigidly on all sides.

During the process of formation, while the paste of the positive plates is being converted into peroxid, the plates tend to expand to a considerable extent, and owing to the rigid confinement at the sides and top and bottom this expansion can only be in thickness, as allowed by the elastic pads $e$. The active material of the plates is thus compressed and rendered close and hard. The pressure, if excessive, can be relieved by a turn of the screw $n$. During discharge the pressure on the plates is maintained by the resiliency of the pads $e$. The active material is thus not only rendered hard and homogeneous, but it is also kept tightly against the conducting-grid of the plate, insuring perfect contact.

Having thus described the nature of this invention and the best means I know of carrying the same into practical effect, I claim—

1. An apparatus for forming secondary-battery plates, consisting of a box in which the plates are arranged side by side, devices rigidly holding the plates at the top, bottom and sides, an adjustable end piece, and elastic end pads which permit expansion of the plates in thickness, substantially as described.

2. An apparatus for forming secondary-battery plates, consisting of a box having a rubber lining and a movable end, means for adjusting said movable end against a series of plates arranged side by side in the box, a cover bearing against the tops of the plates, bottom and side plates having channels for the circulation of an electrolyte, said cover and bottom and side blocks rigidly holding the plates at the top, bottom and sides, porous separating-pieces between the plates, and resilient end cushions which permit expansion of the plates in thickness, substantially as described.

3. An apparatus for forming secondary-battery plates, consisting of a box having a movable end, screw devices for adjusting said movable end against a series of plates arranged in the box, devices for rigidly holding said plates at the top, bottom and sides of the box, and end blocks having elastic pads which permit the plates to expand in thickness, substantially as described.

In testimony whereof I have hereunto set my hand in presence of two subscribing witnesses.

HENRY LEITNER.

Witnesses:
A. M. GLASS,
FRED C. DARUS.